(12) United States Patent
Palo et al.

(10) Patent No.: US 9,612,428 B2
(45) Date of Patent: Apr. 4, 2017

(54) APPARATUS FOR CONFOCAL OBSERVATION OF A SPECIMEN

(71) Applicant: Perkinelmer Cellular Technologies Germany GmbH, Hamburg (DE)

(72) Inventors: Kaupo Palo, Haabneeme (EE); Peet Kask, Harju maakond (EE); Stefan Lupke, Hamburg (DE)

(73) Assignee: Perkinelmer Cellular Technologies Germany GmbH, Hamburg (DE)

( * ) Notice: Subject to any disclaimer, the term of this patent is extended or adjusted under 35 U.S.C. 154(b) by 0 days.

(21) Appl. No.: 14/901,774

(22) PCT Filed: Jun. 25, 2014

(86) PCT No.: PCT/EP2014/063415
§ 371 (c)(1),
(2) Date: Dec. 29, 2015

(87) PCT Pub. No.: WO2015/000764
PCT Pub. Date: Jan. 8, 2015

(65) Prior Publication Data
US 2016/0370566 A1 Dec. 22, 2016

(30) Foreign Application Priority Data

Jul. 4, 2013 (EP) .................................... 13175163

(51) Int. Cl.
| | | |
|---|---|---|
| G02B 21/00 | (2006.01) | |
| G02B 21/06 | (2006.01) | |
| G02B 21/04 | (2006.01) | |

(52) U.S. Cl.
CPC ...... *G02B 21/0076* (2013.01); *G02B 21/0032* (2013.01); *G02B 21/0044* (2013.01); *G02B 21/0064* (2013.01)

(58) Field of Classification Search
CPC ............ G02B 21/0032; G02B 21/0044; G02B 21/0064; G02B 21/0076
See application file for complete search history.

(56) References Cited

U.S. PATENT DOCUMENTS

| | | |
|---|---|---|
| 2006/0012862 A1 | 1/2006 | Engelmann et al. |
| 2009/0296209 A1 | 12/2009 | Kusaka et al. |

FOREIGN PATENT DOCUMENTS

EP        1617261 A1      1/2006

*Primary Examiner* — Mark R Gaworecki
(74) *Attorney, Agent, or Firm* — The Webb Law Firm (57) ABSTRACT

An apparatus for confocal observation of a specimen includes an illumination device. The illumination device generates illumination radiations of at least two different wavelengths. With the aid of a mask device illuminated by the illumination radiations, one mask image is generated per wavelength. An objective serves for imaging said mask images in the specimen. With the aid of a beam splitter device, the emission radiations emitted by the specimen are divided based on the wavelengths, and are detected based on the wavelengths by a detection device.

19 Claims, 3 Drawing Sheets

APPARATUS FOR CONFOCAL OBSERVATION OF A SPECIMEN

CROSS-REFERENCE TO RELATED APPLICATIONS

This application is the United States national phase of International Application No. PCT/EP2014/063415 filed Jun. 25, 2014, and claims priority to European Patent Application No. 13175163.8 filed Jul. 4, 2013, the disclosures of which are hereby incorporated in their entirety by reference.

BACKGROUND OF THE INVENTION

Field of the Invention

The present invention relates to an apparatus for confocal observation of a specimen, wherein the specimen particularly comprises biological and/or chemical substances.

Description of Related Art

Known confocal microscopes comprise an illumination device which can be e.g. a laser. With the aid of the illumination device, an illumination radiation is generated which first will be directed onto a mask which can comprise a plurality of openings, e.g. slits or pinhole apertures. Via an objective, the mask will be imaged in the specimen. In this process, an image of the mask is generated in a clearly defined plane of the specimen, i.e. a specimen region. The illumination radiation causes a reaction in the specimen, thus generating emission radiations. Said reaction can be e.g. a fluorescence excitation of markers included in the specimen, or also a simple reflection of the illumination radiations. The emission radiations emitted by the specimen will be returned, again via said objective, to the mask and will pass through the corresponding openings of the mask. With the aid of a beam splitter device, the emission radiations, after passing through the mask device, will be guided out of the optical path toward a detection device such as e.g. a CCD sensor.

When using mask devices with very small openings, the problem exists that only small amounts of illumination radiation will pass through the mask device and reach the specimen. A known approach to cope with this problem is the provision of microlenses upstream of the openings of the mask device, which microlenses will bundle the beams and resp. guide them toward the openings of the mask device. In this arrangement, the beam splitter device for outcoupling the emission radiations is disposed between the mask device and said beam-bundling device, e.g. the lenses.

In order to increase the obtainable information about the specimen under investigation, it is desirable to illuminate the specimen with illumination radiations of different wavelengths since this would make it possible to also generate emission radiations of different wavelengths. This enables e.g. the observation of multiple types of fluorescent markers, which may be selected to be excited at different illumination wavelengths and/or to emit light at different emission wavelengths, and may further be selected to specifically bind to different functional structures of interest in a biological specimen, in a single experiment. A corresponding illumination or examination of the specimen is performed, for example, by using illumination radiations of different wavelengths at the same time, and detecting emission radiation of different wavelengths at the same time as well. Compared to a sequential illumination and detection at the respective multiple wavelengths, this simultaneous examination can significantly accelerate the measurement. It also avoids potential falsification of the measurement results due to photo-bleaching or photo-damage. Such falsification can occur during sequential illumination and detection if the specimen or certain fluorescent markers are bleached or damaged during a first observation at a first illumination wavelength, and hence emit reduced or altered signals during a subsequent second observation using a second illumination wavelength.

A disadvantage of the simultaneous illumination and detection at multiple illumination and emission wavelengths resides in the risk of crosstalk between the emission radiations, i.e. mutual interference of beams of different wavelengths. For example, a first fluorescent marker, designed to be excited at a first illumination wavelength and emit light at a first emission wavelength, may have a sufficiently broad emission spectrum to contribute radiation emission at a second emission wavelength, which is intended for observation of a second fluorescent marker. This would cause the emission of the second fluorescent marker, and hence its concentration, to be systematically overestimated in a parallel observation experiment if the first marker is present in the specimen. A corresponding crosstalk can occur during the excitation of fluorescent markers, if a fluorescent marker designed to be excited at a first illumination wavelength is also excited by illumination radiation of a second wavelength.

It is an object of the invention to provide an apparatus for confocal observation of a specimen which is adapted for simultaneous examination of the specimen by use of illumination radiations of different wavelengths while delivering examination results of good quality.

SUMMARY OF THE INVENTION

The apparatus for confocal observation of a specimen according to the invention comprises an illumination device such as e.g. a laser. With the aid of the illumination device, which can also comprise a plurality of illumination elements, e.g. lasers, there can be generated illumination radiations of at least two different wavelengths or wavelength ranges. The illumination radiations are irradiated onto a mask device in at least one mask region the mask device spatially modulates the illumination radiation with at least one mask pattern. This at least one mask pattern is imaged onto a specimen region of the specimen by use of an objective. The corresponding emission radiations returning from the specimen also have different wavelengths or wavelength ranges. With the aid of a first beam splitter device, the emission radiations emitted by the specimen will be split depending on the wavelengths. Then, using a detection device, the emission radiations will be detected, again in dependence on the wavelengths. In addition to the detection device used for receiving the emission radiation after it has passed the mask device, the apparatus comprises a scanner for scanning the image of the mask region across the specimen region.

According to the invention a first beam splitter device is positioned between the mask device and the objective means. The first beam splitter device deflects for example the first illumination wavelengths and the corresponding first emission wavelengths at a first deflection angle. Furthermore, the first beam splitter device allows for example a second illumination wavelength and the corresponding second emission wavelength to pass through the first beam splitter device. Alternatively, the second illumination wavelength and the corresponding second emission wavelength can be deflected at a second deflection angle being different from the first deflection angle. According to the invention, due to the different deflection at the first beam splitter device, at least two different mask patterns generated by the first and second illumination wavelengths respectively are imaged into the specimen region, generating at least two different emission radiations being detected by the detection device.

By the inventive provision of a plurality of mask images, which in an embodiment are arranged in a way that the illuminated locations in the respective mask images do not overlap each other or do so only slightly, emission radiations of different wavelengths can be detected at the same time, while avoiding undesired spectral crosstalk. According to the invention, this avoidance of crosstalk is obtained as follows: A first pattern of locations in the specimen region is illuminated by illumination radiation of a first illumination wavelength only, and emission radiation at a corresponding first emission wavelength is collected from this pattern of locations and detected by the detection device. This enables observation of e.g. a first fluorescent marker designed to be excited at the first illumination wavelength, and to emit light at the first emission wavelength. Alternatively, the first emission wavelength may be essentially the same as the first illumination wavelength, and light scattered from the specimen at such wavelength may be observed.

Simultaneously, a second, different pattern of locations in the same specimen region is illuminated by a illumination radiation of a second illumination wavelength, and emission radiation at a corresponding second emission wavelength is collected from this second pattern of locations and detected by the detection device. This enables observation of e.g. a second fluorescent marker designed to be excited at the second illumination wavelength, and to emit light at the second emission wavelength. In contrast to the known arrangements of the prior art, even if the emission spectra of the first and second fluorescent markers exhibit significant spectral overlap, crosstalk will be effectively suppressed. This is due to the fact that only the marker of interest will be excited by the first or second illumination radiation in the respective first and second pattern of locations in the specimen while emission radiation of the first and second wavelength is collected respectively. Hence, as long as the excitation spectra of the fluorescent markers are spectrally separated, one will not obtain any fluorescent emission radiation from the undesired fluorescent marker while observing the marker of interest in the first and second pattern of locations, respectively.

Thus, the information content obtained in one examination step performed on the specimen will have been multiplied, without having introduced a falsification of the results by spectral crosstalk. This is of particular advantage in specimens which are destroyed or at least damaged by the examination.

According to a first embodiment of the invention at least two different mask patterns are generated by illuminating a single mask region with the illumination radiation, where the illumination radiation comprises at least two different wavelengths. The at least two different mask patterns each projected by a different wavelength are deflected by the first beam splitter device in such a way that the images of the mask region in the specimen region are laterally displaced to each other. The beam splitter device is, for example, a wavelength-dependent beam splitter. If two different mask patterns are generated the beam splitter device deflects the first illumination wavelength in such a way that the image of the mask region in the specimen region created by the first illumination wavelength is laterally displaced compared to the image created by the second illumination wavelength. For example, the beam splitter may be arranged to deflect the first illumination wavelength at a deflection angle, while the second illumination wavelength passes the beam splitter without deflection, and is then deflected by a mirror which is arranged downstream from the beam splitter to deflect the second illumination wavelength by the same deflection angle. The first and second illumination wavelengths, which are now laterally displaced compared to each other, are then incident onto a tube lens and the objective means, which project the corresponding images of the mask regions into the specimen region laterally displaced compared to each other.

According to a second exemplary embodiment of the invention at least two different mask patterns are generated by illuminating at least two different mask regions. If two different mask patterns are generated a first mask region is illuminated with a first illumination wavelength and a second mask region is illuminated with a second illumination wavelength. By use of the first beam splitter device the different images of the mask regions, particularly the two images of the first and second mask regions are combined into the same specimen region. For example, the beam splitter can be a wavelength dependent beam splitter, which is designed to deflect the first illumination wavelength while letting pass the second illumination wavelength. This beam splitter is arranged in the optical path of the first illumination wavelength, downstream from the first mask region of the mask device, to deflect the first illumination wavelength at a first deflection angle. The second illumination wavelength, after having passed the mask device in the second mask region, travels along a separate optical path downstream from the mask device, and is deflected by a mirror which is arranged to direct the second illumination radiation towards the beam splitter. After having passed the beam splitter without deflection, the second illumination wavelength follows the same optical path towards the objective means as the first illumination wavelength. The objective means projects the corresponding images of the first and second mask regions into the same specimen region.

According to an exemplary embodiment of the invention, the mask device comprises at least two separate masks, each of these masks generating a mask pattern. Advantageously, in this manner, the mask patterns can be attuned to each other in such a manner that the illuminated locations in the images of the respective mask regions will not, or only slightly, overlap each other.

Alternatively, the mask device can also be designed to comprise only a sole mask while, however, for generating the mask images, said sole mask will be illuminated in different regions thereof. This is of advantage when using illumination devices comprising e.g. two lasers because each laser, whose illumination radiation generates a respective wavelength, can be directed toward a different spatial region of the mask.

Particularly if more than two mask images are generated, a combination of the two above options is advantageous in order to realize a confocal microscope having a spatially compact size.

In an embodiment, the emission wavelengths are selected to be identical to the corresponding illumination wavelength to enable detection of light scattered by the specimen. The emission wavelengths are, for example, selected by wavelength-selective optical elements which are provided as part of the detection device. These wavelength-selective optical elements are chosen to select wavelengths or wavelength ranges overlapping with or identical to the illumination wavelength ranges. For example, the detection device can comprise a plurality of detectors and different spectral bandpass filters which are designed to selectively transmit one of the desired emission wavelengths to each detector respectively. The emission radiation is, for example, divided by a wavelength-dependent second beam splitter and directed to the corresponding detectors. Alternatively, a wavelength-dispersive element—e.g. a prism or a grating—can be used to separate the emission radiation into multiple spectral components, and a plurality of individual detectors or a multi-element detector array can then be arranged to receive the desired spectral components.

Alternatively, the emission wavelengths can be selected to be different from the corresponding illumination wavelengths to enable detection of fluorescence light emitted by the specimen. To this end, fluorescent markers are selected which can be excited at the desired illumination wavelengths, and which can be introduced into the specimen under study. The detection device is again equipped with wavelength-selective optical elements to select the emission wavelengths, as described above. In contrast to the above-mentioned embodiment configured for the detection of scattered light, the wavelength selective optical elements are chosen to select wavelengths or wavelength ranges overlapping with or identical to the fluorescence emission wavelength ranges of the fluorescent markers.

In another embodiment, the mask pattern imaged into the specimen region by the first illumination wavelength is congruent with the mask pattern imaged into the specimen region by the second illumination wavelength. In this embodiment the imaged mask patterns are laterally displaced to each other. Alternatively, one or both mask patterns can be mirrored, rotated or distorted during the imaging into the specimen. Although in this example there are two different mask patterns it is also possible to have a large number of mask patterns being displaced towards each other.

In yet another embodiment the imaged mask patterns are not congruent to each other. In this embodiment it is not necessary but also possible to laterally displace the mask pattern images towards each other.

Additionally the apparatus for confocal observation of a specimen comprises a scanner for scanning the image of the mask region across the specimen region. The function of a scanner is to realize a movement of the illumination radiation within the specimen. This enables the acquisition of a complete confocal image of the specimen, either by recording a time series of detected emission radiation intensity while the mask region image is scanned across the specimen, or by integrating emission radiation signals on a detector which provides spatial resolution, e.g. a CCD camera, while the mask region image is canned across the specimen. This can be done by means for moving the mask device and/or for moving the specimen. Alternatively or in addition to these moving means a variable deflecting means, like a moving mirror, can be used.

According to a further embodiment, the mask device comprises a rotatable mask device such as e.g. a Nipkow disk. The rotation of the mask device provides a simple way of moving the mask device, and hence scanning the image of the mask region across the specimen region.

In this example, the mask device will comprise small openings in a surface which is otherwise reflective or absorptive to the illumination radiation, in order to obtain confocal images with high axial resolution. This implies that only a small fraction of a spatially homogeneous illumination radiation incident on the mask device can pass the mask device and reach the specimen. For improving the illumination yield, when viewed in relation to the propagation direction of the illumination radiations, a beam bundling device for bundling the illumination radiations onto openings of the mask device is arranged upstream of the mask device. The beam bundling device can be, for example, an array of microlenses, which are arranged in the same pattern as an array of pinhole openings disposed on the mask device, such that one microlens spatially corresponds to each pinhole. If the mask device is rotatable, the bundling device needs to be rotated in synchronization with the mask device, for example by mounting both on the same axis of rotation.

The illumination radiations as well as the emission radiations are guided through one common objective. Through this common objective, all mask images will be imaged into the specimen. This can allow for a considerable cost reduction and easier alignment of the apparatus. Alternatively, separate objectives can be used for illumination and emission radiation respectively, or for the respective pairs of illumination radiation and corresponding emission radiation.

The detection device of the apparatus of the invention comprises a separate detector for each wavelength. Therefore, the detection comprises a second beam splitter device for dividing the emission radiation onto a plurality of the detectors in dependency of the wavelengths.

Further, the apparatus of the invention comprises a beam deflection device. The latter serves for compensation of differences in the lengths of the traveling paths of the illumination radiations and emission radiations of different wavelengths. For examining the specimen, it is beneficial if no differences exist between the traveling path lengths of the illumination radiations and emission radiations of different wavelengths. For this purpose, said beam deflection device is arranged between the specimen and the mask device and particularly between the objective and the mask device. The lengths of the traveling paths between the specimen and the mask device and resp. the individual masks or images on a mask, shall be identical to the largest extent possible.

According to a further embodiment of the invention, a further beam splitter device is arranged between the mask device and the illumination device, between the mask device and the beam bundling device. This beam splitter device is operative to separate the emission radiations from the illumination radiations.

BRIEF DESCRIPTION OF THE DRAWINGS

The invention will be explained in greater detail hereunder by way of embodiments, while making reference to the accompanying drawings, in which.

DETAILED DESCRIPTION OF THE INVENTION

Throughout the following description of various embodiments of the invention, similar or identical components are marked by the same reference numerals.

Figure 1:
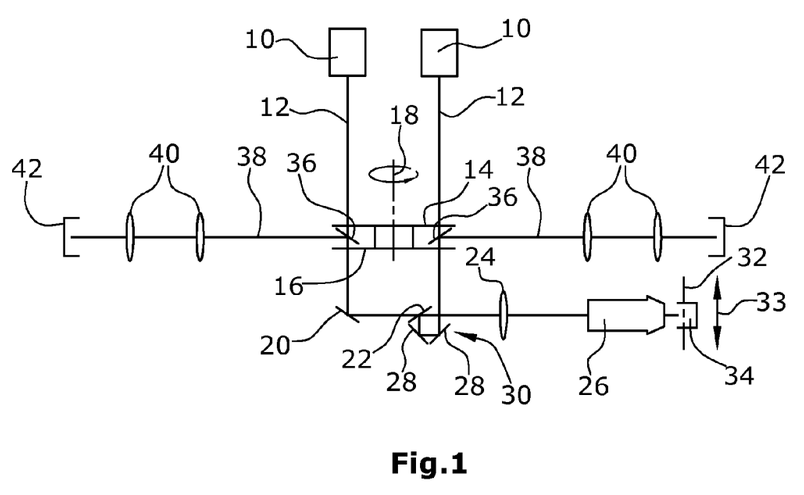
FIG. 1 is a schematic representation of a first embodiment of the apparatus.

In the embodiment according to FIG. 1, an illumination device comprising two light sources 10 is used. Each light source 10 comprises a laser and telescope optics (not shown individually) disposed to expand and re-collimate the laser beams into two illumination radiations 12 of different wavelengths or wavelength ranges. The two illumination radiations 12 are incident onto an optional beam bundling device 14. In the illustrated embodiment, said beam bundling device 14 is provided in the form of a disk comprising a plurality of microlenses, said disk being arranged for rotation about an axis 18. Parallel to beam bundling device 14, a mask device is arranged which in the illustrated embodiment is a Nipkow disk 16. Assigned to each of the individual openings of the Nipkow disk 16 is a respective microlens of beam bundling device 14.

The illumination radiation 12 on the left-hand side in FIG. 1 will be deflected by a mirror 20 after passing through the mask device 16. Then, said radiation will pass through a beam splitter 22, without deflection of the beam. Subsequently, the beam will enter an objective 26 via a lens 24.

Beam splitter 22 is a wavelength-dependent beam splitter. Due to a suitably designed multi-layer thin film coating on one of its surfaces, it transmits the first illumination radiation 12 shown on the left-hand side of FIG. 1 as well as the corresponding first emission radiation, and reflects the second illumination radiation 12 shown on the right-hand side, as well as the corresponding second emission radiation.

The other illumination radiation 12, i.e. the one on the right-hand side in FIG. 1, after passing through the mask device 16 will be incident onto two mirrors 28 and then onto the beam splitter 22 whereupon, because of the wavelength of this illumination radiation, this beam will be deflected by beam splitter 22 toward lens 24. The second illumination radiation will travel through the lens 24 and into the objective 26 together with the first illumination radiation.

By mirror 28 and beam splitter 22, there is created a beam deflection device 30 serving for compensation of the differences of the travel path lengths. Thereby, it is safeguarded that the two mask images generated by mask device 16 will be imaged in the same image plane 32 defining the specimen region within specimen 34.

First, both of the emission radiations generated in image plane 32 within specimen 34 will pass through the objective 26 and into lens 24; then, however, they will be separated from each other by beam splitter 22. The emission radiation corresponding to the illumination radiation on the left in FIG. 1 will pass through beam splitter 22 and be incident onto mirror 20. The mission radiation corresponding to the illumination radiation on the right, not passing through beam splitter 22, will be deflected toward the mirror 28.

From mirror 20, the emission radiation shown on the left in FIG. 1 reaches the beam splitter 36. Beam splitter 36 will separate the emission radiation 38 from the corresponding illumination radiation 12. If the apparatus of FIG. 1 is to be used or the observation of fluorescent emission radiation from specimen 34, the emission radiation 38 of interest has a wavelength different from the illumination radiation 12, and beam splitter 36 is for example a wavelength dependent beam splitter. If, on the other hand, the apparatus is to be used for the observation of scattered radiation from specimen 34, the emission radiation 38 of interest is identical in wavelength to the illumination radiation 12, and beam splitter 36 is for example a partially reflective mirror or a polarization-dependent beam splitter.

Via a lens arrangement 40, emission radiation 38 will then reach the detector 42. Detector 42 can be provided in the form of a CCD, EMCCD or SCMOS camera sensor. Detector 42 may further comprise a wavelength-dependent filter, e.g. a bandpass filter, to limit the spectral components of the emission radiation which are detected.

The second emission radiation which has been separated by the first beam splitter 22 will travel, via the mirrors 28, to a further beam splitter 36 shown on the right-hand side of FIG. 1. The latter will separate the emission radiation 38 from the right-hand illumination radiation 12 in FIG. 1 and will direct this emission radiation toward the right-hand side in FIG. 1, again through a lens arrangement 40, and onward to a detector 42.

A scanner is used to realize a relative movement of the illumination radiations within the specimen 34. This can be realized by moving means for moving the mask device 16, such as by rotating it around axis 18, and/or by means for moving the specimen 34, which within FIG. 1 are illustrated as arrow 33.

Figure 2:
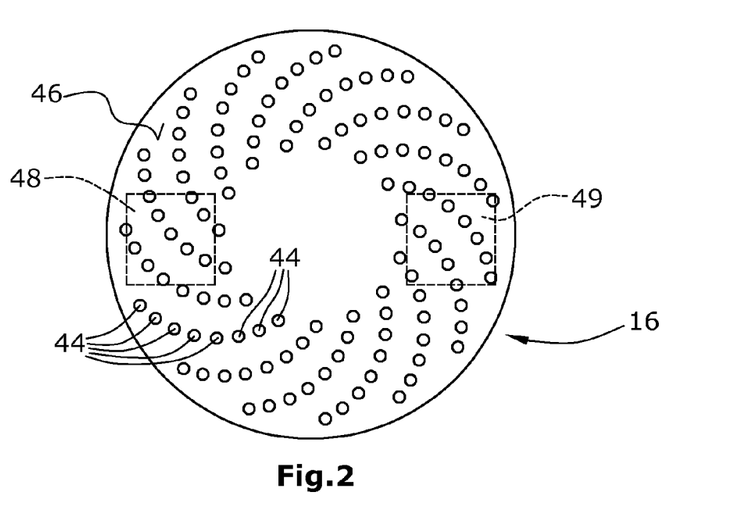
FIG. 2 is a schematic plan view of a mask device used in the embodiment shown in FIG. 1.

In FIG. 2, a Nipkow disk 16 is shown in plan view. Said disk is made from a material which reflects or absorbs the illumination radiation 10, or is made from glass or another transparent material, but coated with a reflective or absorbing surface layer. The disk and/or said surface layer comprises a plurality of openings 44, arranged on spiral-shaped lines. In correspondence to said openings 44, a respective microlens is arranged for each opening 44 on the beam bundling device 14 located above the openings 44.

On a top side of the Nipkow disk 16, a respective illumination field 48, 49 is illuminated by each of the two collimated light sources 10. Corresponding thereto, two mask patterns are generated which are imaged in the specimen 34 in said specimen region 32. The two mask patterns will then be superimposed onto each other. Within the two images, there are then provided spiral-shaped rows of illumination points arranged in mutually opposite senses. Since, in this embodiment, the Nipkow disk 16 rotates together with the beam bundling device, also the mask images will be moved relative to the specimen 34.

As the images of mask areas 48, 49 are moving relative to the specimen 34, individual openings 44 in each of the areas 48, 49 will occasionally be imaged to the same location in specimen region 32 at the same time. The simultaneous presence of both, the left and right-hand illumination radiation 12, will result in a temporary and localized spectral crosstalk contribution in emission radiations 38. Since the crosstalk contribution from a single coincidence of openings 44 is negligibly small compared to the spectral crosstalk occurring in a conventional microscope not using the arrangement of the present invention, this is of no concern. However, due to the quasi-periodic structure of the spiral pattern of openings 44, there is an increased probability that during a full rotation of mask device 16, the images of further openings 44 in each of the areas 48, 49 will coincide in the same location within specimen region 32. This will cause repeated crosstalk contributions in said location, resulting in a potentially noticeable total crosstalk signal in said location, and is therefore undesirable.

In an embodiment of the invention, the openings 44 are therefore arranged in a deformed spiral pattern, which is created by displacing the positions of the individual openings from a perfect spiral pattern in an angular and/or radial direction, and in dependence of the angular and/or radial coordinates of the individual openings 44, wherein the coordinate system is defined by the rotational axis of the mask device 16. This will ensure that, over a full rotation of mask device 16, the locations where images of individual openings 44 in each of the areas 48, 49 coincide are more evenly distributed across specimen region 32, hence avoiding an increased crosstalk contribution in certain locations.

To ensure that the illumination intensity and detection efficiency remains constant across specimen region 32, the positions of the individual openings 44 are displaced from a perfect spiral pattern in the angular and radial direction in a way that introduces local fluctuations of the number of openings 44 per surface area of the mask device 16 of not more than 5%, and not more than 1%. In a particular embodiment, the positions of individual openings 44 are displaced from a perfect spiral pattern in the angular direction by an amount $$\Delta\theta = \frac{a_1}{r}\sin(j\theta),$$

and in the radial direction by $\Delta r = a_2 \cos(k\theta+\phi)$, wherein $\theta$ denotes the angular coordinate, $r$ the radial coordinate, harmonic factors $j$ and $k$ are arbitrary natural numbers, and amplitudes $a_1$ and $a_2$ as well as phase $\phi$ are arbitrary real numbers. In a specific example the amplitudes $a_1$ and $a_2$ are smaller than the distance between neighboring openings 44.

In another embodiment, the occurrence of individual openings 44 in each of the areas 48, 49 being imaged to the same location in specimen region 32 at the same time is avoided by introducing a 180° rotation around the optical axis into the beam path for imaging either area 48 or area 49 onto specimen region 32. Such rotation can be achieved by mirror or prism arrangements known in the art. In this embodiment, the images of the spiral patterns in regions 48 and 49 in specimen region 32 are oriented in parallel rather than opposite senses, and will move in parallel upon rotation of the mask device 16. By appropriate alignment of the relative location of the images of areas 48 and 49 in specimen region 32, the images of individual openings 44 in areas 48 and 49, respectively, can therefore be positioned away from each other, and will maintain their distance upon rotation of the mask device 16. The occurrence of locations in specimen region 32 which are illuminated by both, left and right illumination radiation 12, is therefore avoided entirely.

Alternatively, two different mask patterns can be generated by illuminating a single mask region 48 with the illumination radiation. To generate two different images of the mask region 48 the beam splitter device 22 deflects the first illumination wavelength in such a way that the image of the mask region 48 in the specimen region 42 created by the first illumination wavelength is laterally displaced compared to the image created by the second illumination wavelength by use of the same mask region 48.

Figure 3:
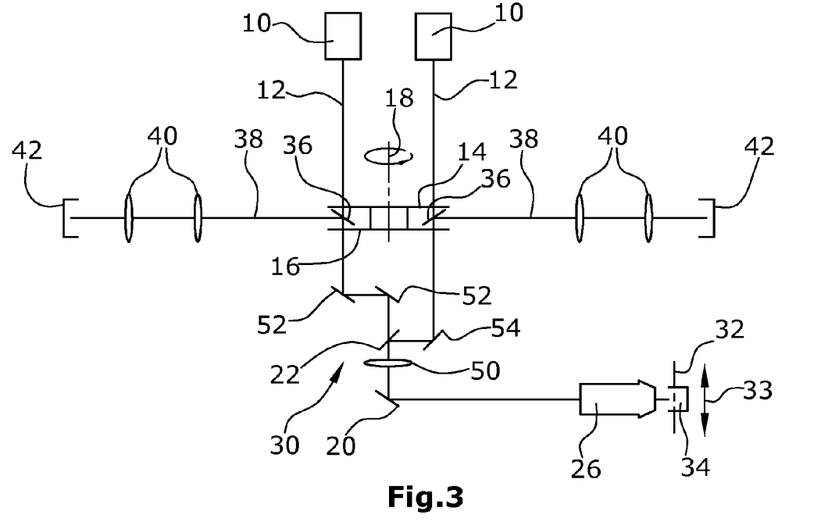
FIG. 3 is a schematic representation of a second embodiment of the apparatus.

FIG. 3 illustrates an embodiment substantially corresponding to the embodiment according to FIG. 1. The only difference between these two embodiments consists in the design of the beam deflection device 30. In the following, the function of the beam deflection device will be explained for the paths taken by the emission radiations of different wavelengths. The corresponding illumination radiations will follow the same paths through the beam deflection device.

To begin with, the mirror 20 is arranged below the Nipkow disk 16 so that the two emission radiations 38 after passing through a lens 50 will be incident on beam splitter 22. Beam splitter 22 is a wavelength-dependent beam splitter like in the embodiment according to FIG. 1. The emission radiation on the left-hand side in FIG. 3 will be guided to the Nipkow disk 16 via two mirrors 52 and then, again through the beam splitter 36, toward detector 42.

In a corresponding manner, the emission radiation 38 on the right-hand side in FIG. 3 will be directed, from beam splitter 22, toward a mirror 54 and from the latter to the right-hand beam splitter 36. From beam splitter 36, the emission radiation 38 will then reach the right-hand detector 42.

Figure 4:
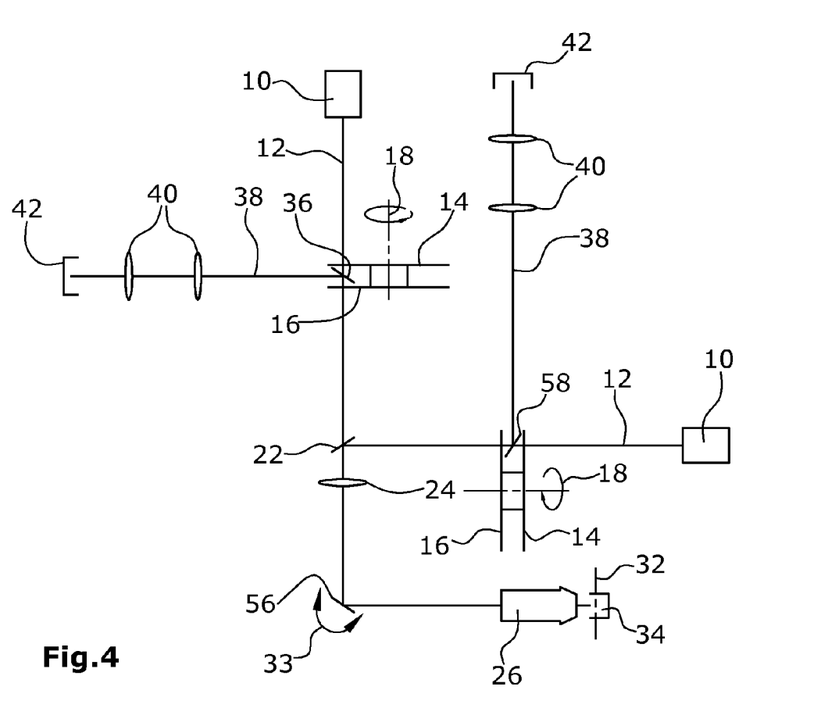
FIG. 4 is a schematic representation of a third embodiment of the apparatus.

In the embodiment illustrated in FIG. 4, the essential difference resides in that the mask device comprises two separate Nipkow disks 16. Each of the two Nipkow disks 16 is illuminated with expanded and collimated illumination radiation 12 by a respective light source 10. The two illumination radiations 12 will be combined via the first beam splitter 22 which can be a wavelength-dependent beam splitter, and then will pass through lens 24 and, via a mirror 56, reach the objective 26. Via objective 26, the mask images generated by the Nipkow disks 16 will be imaged in the plane 32 of specimen 34.

The emission radiations will be split by beam splitter 22 and will travel either via beam splitter 36 to detector 42 on the left-hand side or via the other via beam splitter 58 to detector 42 on the right-hand side.

In the embodiment shown in FIG. 4, the arrangement is designed to the effect that the need for an additional beam deflection device 30 for compensation of differences in the travel path length is obviated.

In the embodiment according to FIG. 4, the scanner for scanning the image of the mask region across the specimen region 32 is realized as means for moving both mask devices 16, by rotating each of them around its respective axis 18. Alternatively, a tilt mechanism acting on mirror 56 can be incorporated. This will make mirror 56 act as a variable deflection device positioned between the mask device 16 and the specimen 34, which deflects both, the illumination and emission radiations, in order to scan the image of the mask regions across the specimen region 32.

Figure 5:
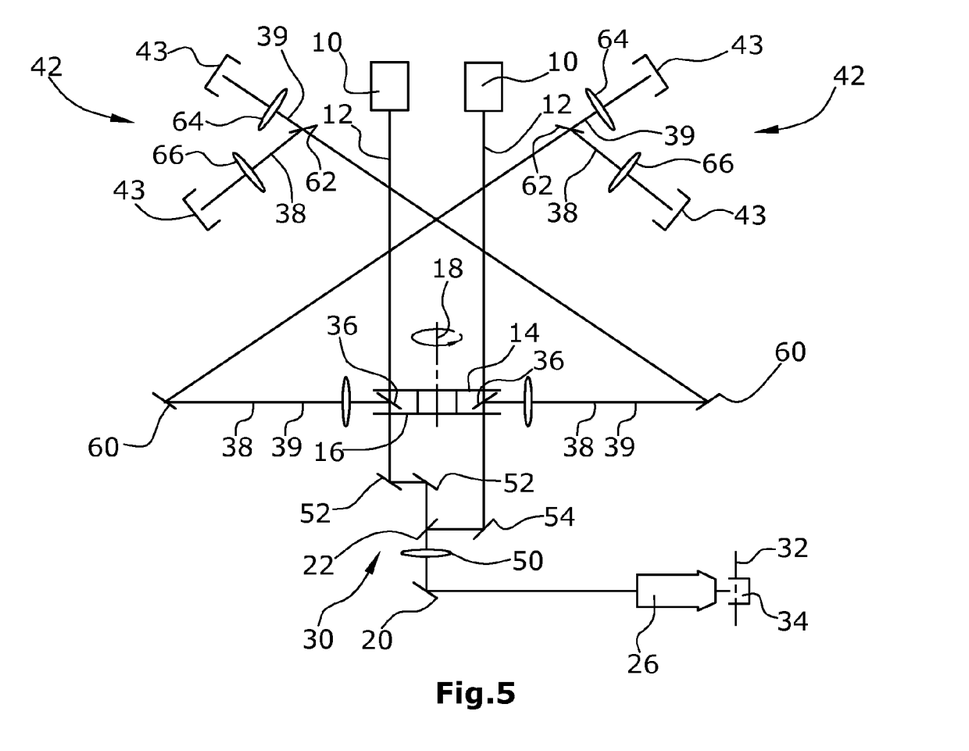
FIG. 5 is a schematic representation of a fourth embodiment of the apparatus.

In a further, embodiment shown in FIG. 5, it is provided that four mask images are generated in the plane 32 of specimen 34. For this purpose, the two light sources 10, comprising lasers and telescope optics, each generate two expanded and collimated illumination radiations of different wavelengths, resulting in the generation of a total of four illumination radiations of different wavelengths. As represented in FIG. 3, these illumination radiations will be bundled, via the lenses of beam bundling device 14, onto the Nipkow disk 16. Still as represented in FIG. 3, the first pair of illumination radiations 12 will travel via the mirrors 52, the beam splitter 22, the lens 50 and the mirror 20 to the objective 26. The other pair of illumination radiations 12 will travel via mirror 54, beam splitter 22, lens 50 and mirror 20 to objective 26. By beam splitter 22, the four emission radiations emitted by the specimen will be divided into two pairs of emission radiations, which after passing the mask device 16 are deflected by beam splitters 36. Each of the resulting emission radiations 38, 39 will be guided respectively via an oblique mirror 60 to a further beam splitter 62. This beam splitter 62 will split the respective two emission radiations 38, 39 and guide them through the lenses 64, 66 to four different detector devices 43, each of said detector devices 43 being operative to detect one wavelength.

Figure 6:
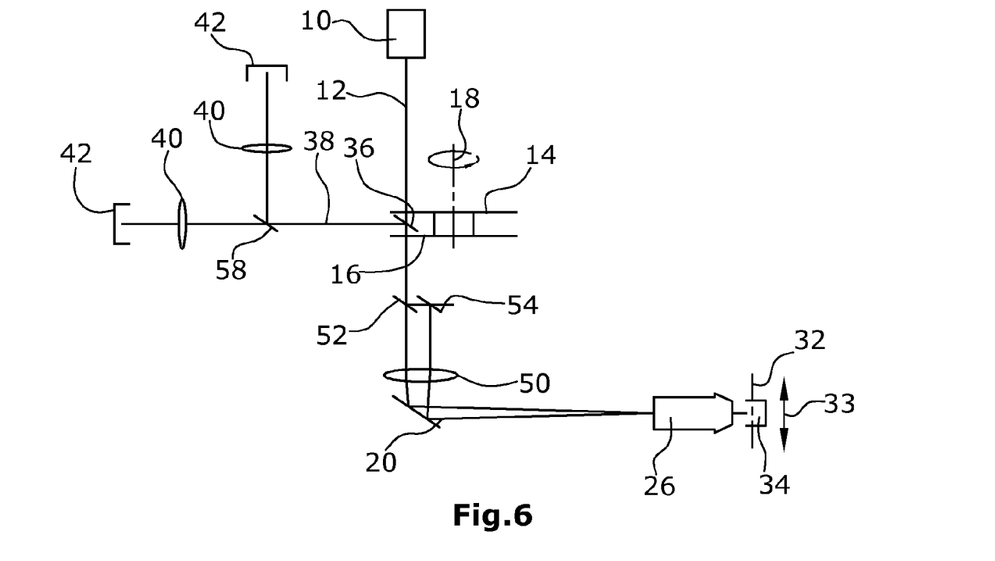
FIG. 6 is a schematic representation of a fifth embodiment of the apparatus.

FIG. 6 shows another embodiment, which generates two different mask patterns by illuminating a single mask region with the illumination radiation 12. The illumination radiation 12 comprises at least two different wavelengths, which are generated by light source 10. Light source 10 can e.g. be a multi-line laser, or a light engine which combines light from multiple lasers, light-emitting diodes or other light sources into a joint output. The illumination radiation 12, which comprises both wavelengths, passes beam bundling device 14 and mask device 16 before reaching beam splitter 52.

Beam splitter 52 is a wavelength-dependent beam splitter. Due to a suitably designed multi-layer thin film coating on one of its surfaces, it transmits the first wavelength of illumination radiation 12, shown on the left-hand side of FIG. 6, as well as the corresponding first emission radiation. Beam splitter 52 reflects the second wavelength of illumination radiation 12, shown on the right-hand side, as well as the corresponding second emission radiation. The second wavelength of illumination radiation 12, after being reflected by beam splitter 52, is further reflected by mirror 54. Both components of the illumination radiation proceed along parallel paths toward lens 50. Lens 50 together with objective 26 forms an optical imaging system which images mask device 16 into the image plane 32 within specimen 34. Due to the displacement introduced by beam splitter 52 and mirror 54, the mask images projected by the first and second illumination wavelength are laterally displaced towards each other.

Emission radiation generated in image plane 32 within specimen 34 will pass through the objective 26 and into lens 50. Due to its wavelength-dependent reflection properties explained above, beam splitter 52 combines emission radiation of the first and second wavelength, respectively, onto a common optical axis. The combined emission radiation passes mask device 16 and is reflected by beam splitter 36 which, as in other embodiments discussed before, can be a wavelength-dependent beam splitter which transmits the illumination radiation 12 and reflects the emission radiation. A further wavelength-dependent beam splitter 58 separates the emission radiation of the first wavelength from emission radiation of the second wavelength, and directs the two radiation components via lenses 40 to detectors 42.

The invention claimed is:

1. An apparatus for confocal observation of a specimen, comprising:
    an illumination device that generates illumination radiation comprising a first and a second illumination wavelength,
    a mask device which is illuminated by said illumination radiation in at least one mask region, to spatially modulate the illumination radiation with at least one mask pattern,
    an objective that images said at least one mask pattern onto a specimen region of the specimen, and for imaging onto the at least one mask region an emission radiation comprising a first and a second emission wavelength, which is emitted by the specimen in response to the two different wavelengths of the illumination radiation,
    a detection device that receives the emission radiation after the emission radiation has passed the mask device,
    a scanner that scans the image of the mask region across the specimen region,
    wherein a first beam splitter is positioned between the mask device and the objective, wherein the first beam splitter deflects the first illumination wavelength and the corresponding first emission wavelength at a first deflection angle and allows the second illumination wavelength and the corresponding second emission wavelength to pass through or to be deflected at a second deflection angle such that two different mask patterns generated by different wavelengths are imaged into the specimen region by the first and the second illumination wavelengths respectively.

2. The apparatus according to claim 1, wherein the two different mask patterns are generated by illuminating a single mask region with the illumination radiation, and wherein the first beam splitter device deflects the first illumination wavelength such that the image of the mask region in the specimen region created by the first illumination wavelength is laterally displaced or rotated around the optical axis or mirrored compared to the image created by the second illumination wavelength.

3. The apparatus according to claim 1, wherein the two different mask patterns are generated by illuminating a first mask region with the first illumination wavelength and a second mask region with the second illumination wavelength, and wherein the first beam splitter device combines the images of said first and second mask regions into the same specimen region.

4. The apparatus according to claim 3, wherein the mask device comprises a separate mask for each mask region.

5. The apparatus according to claim 3, wherein the mask device comprises a sole mask which is illuminated in different regions for generating the mask patterns.

6. The apparatus according to claim 3, wherein the mask pattern imaged into the specimen region by the first illumination wavelength is not congruent with the mask pattern imaged into the specimen region by the second illumination wavelength.

7. The apparatus according to claim 1, wherein the emission wavelengths are selected to be identical to the corresponding illumination wavelengths, to enable detection of light scattered by the specimen.

8. The apparatus according to claim 1, wherein the emission wavelengths are selected to be different from the corresponding illumination wavelengths, to enable detection of fluorescence light emitted by the specimen.

9. The apparatus according to claim 1, wherein the detection device comprises a second beam splitter device for dividing, based on the wavelengths, the emission radiation onto a plurality of detectors.

10. The apparatus according to claim 1, wherein the mask pattern imaged into the specimen region by the first illumination wavelength is congruent with but laterally displaced towards the mask pattern imaged into the specimen region by the second illumination wavelength.

11. The apparatus according to claim 1, wherein the scanner comprises a mechanism for at least one of moving the mask device and moving the specimen.

12. The apparatus according to claim 1, wherein the scanner comprises a variable deflection device positioned between the mask device and the specimen, to deflect the illumination radiation and the emission radiation.

13. The apparatus according to claim 1, wherein the mask device is rotatable and comprises a Nipkow disk.

14. The apparatus according to claim 13, wherein the rotatable mask device comprises transparent openings, wherein the openings are arranged in a deformed spiral pattern, which deformed spiral pattern is created by displacing the positions of the individual openings from a perfect spiral pattern in an angular and/or radial direction, and in dependence of the angular and/or radial coordinates of the individual openings, where the coordinate system is defined by the rotational axis of the mask device.

15. The apparatus according to claim 14, wherein the positions of the individual openings are displaced from the perfect spiral pattern in the angular and radial direction to introduce local fluctuations of the number of openings per surface area of the mask device of not more than 5%.

16. The apparatus according to claim 14, wherein the positions of individual openings are displaced from the perfect spiral pattern in the angular direction by an amount $$\Delta\theta = \frac{a_1}{r}\sin(j\theta),$$

and in the radial direction by $\Delta r = a_2 \cos(k\theta+\phi)$, wherein $\theta$ denotes the angular coordinate, r the radial coordinate, harmonic factors j and k are arbitrary natural numbers, and amplitudes $a_1$ and $a_2$ as well as phase $\phi$ are arbitrary real numbers.

17. The apparatus according to claim 1, wherein a beam bundling device is arranged upstream of the mask device, for bundling the illumination radiations onto openings in the mask device.

18. The apparatus according to claim 1, wherein the detection device comprises a separate detector per emission wavelength.

19. The apparatus according to claim 1, wherein a beam deflection device is arranged between the specimen and the mask device, or [between the objective device and the mask device], said beam deflection device being provided to compensate differences of the travel path lengths of the emission radiation and of the illumination radiation of different wavelengths.

\* \* \* \* \*